(12) United States Patent
Cheung (10) Patent No.: US 7,693,652 B2
(45) Date of Patent: Apr. 6, 2010

(54) WAYPOINT ADJUSTMENT AND ADVERTISEMENT FOR FLEXIBLE ROUTING

(75) Inventor: Matthew Cheung, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 11/398,046

(22) Filed: Apr. 5, 2006

(65) Prior Publication Data

US 2007/0239348 A1 Oct. 11, 2007

(51) Int. Cl.
*G01C 21/00* (2006.01)

(52) U.S. Cl. .............. 701/200; 701/201; 701/207; 701/300; 340/995.1

(58) Field of Classification Search ......... 701/200–212, 701/300; 340/988, 990, 995.1
See application file for complete search history.

(56) References Cited

U.S. PATENT DOCUMENTS

| | | | |
|---|---|---|---|
| 6,208,934 B1 * | 3/2001 | Bechtolsheim et al. ...... 701/209 |
| 6,678,611 B2 * | 1/2004 | Khavakh et al. ............ 701/210 |
| 6,993,429 B2 * | 1/2006 | Obradovich et al. ......... 701/200 |
| 2003/0236617 A1 * | 12/2003 | Yamada et al. .............. 701/209 |
| 2005/0071080 A1 * | 3/2005 | Sano .......................... 701/209 |

OTHER PUBLICATIONS

U.S. Appl. No. 11/058,057, filed Feb. 14, 2005, Couckuyt, et al.

* cited by examiner

*Primary Examiner*—Gertrude Arthur Jeanglaud
(74) *Attorney, Agent, or Firm*—Shook, Hardy & Bacon L.L.P.

(57) ABSTRACT

A unique routing system and method that facilitates adjusting waypoint locations to optimize a cost function and presenting more relevant contextual advertisements based in part on the waypoint locations. The system and method involve examining waypoint locations including a start, end, and any in-between waypoint to determine whether they are reachable or routable according to the preferred mode of transportation. Adjustments can be made to one or more of the waypoint locations in order to accommodate this mode of transportation in view of a given cost function. Adjustments can be made that optimize the cost function to minimize overall costs. Multi-modal routing can be initiated as well to configure a route using the selected or adjusted waypoints and multiple modes of transportation in order to optimize the cost function. Adjustments and the selection of contextual advertisements can be based on user intention and several other route related factors.

20 Claims, 10 Drawing Sheets

WAYPOINT ADJUSTMENT AND ADVERTISEMENT FOR FLEXIBLE ROUTING

BACKGROUND

From onboard navigation systems to online navigation and mapping websites, users have virtually unlimited resources when it comes to obtaining driving directions. For example, in their personal vehicle, they can be given turn-by-turn directions to a selected destination and can be provided with a map display of their current location as they proceed along. For those who plan ahead, directions can be obtained and trips can be planned from the Internet or other computer program according to selected start and end points. Despite the many conveniences that both of these conventional techniques provide, they tend to be more problematic and restrictive in use. For instance, such conventional systems rely on and in most cases require address input in order to determine a reasonable set of driving directions. Otherwise, the midpoint of the end destination or beginning point is used. So if a user selects Los Angeles, Calif. as the end destination, conventional systems provide directions to about the midpoint of the city, which is probably not useful considering the size of the city.

Furthermore, conventional routing systems tend to assume that the user can travel from start to finish using the same means of transportation which in some cases may not be true. Oftentimes, these systems also fail to account for travel delays such as road construction or traffic volumes and rather focus only on the route.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and methodology that facilitate providing a more reasonable route given arbitrarily selected waypoints such as a start, end, and any other points in between. In addition, the systems and methods facilitate serving more relevant contextual advertisements based at least in part on the suggested or selected route. More specifically, the system can generate a route based on start, end, and in-between waypoints that have been arbitrarily selected. That is, unlike conventional routing systems, specific addresses need not be given. Rather, a city or street can be entered or an area on a map-based image can be selected, and the system can determine the most reasonable route to arrive at such waypoints. When any selected points of the route cannot be readily reached by the desired mode of transportation, the system can analyze several factors such as user intentions, selected preferences, overall route length, local logistics conditions, timing (e.g., delay or wait times), and any other travel-related expenses to optimize a cost function and minimize overall costs.

Based on the computation(s), the route can be automatically adjusted accordingly in order to direct the user to the closest possible point to the destination—particularly when the selected end or waypoint is not reachable by the selected transport mode. This can be accomplished in part by inferring user intent based on other information gathered from underlying networks or databases. For example, a user may have selected an area to stop that is very close to an enormous shopping mall. Using various inference schemes, it can be inferred that the user intends to go to the mall to eat and shop before continuing on with the trip. Instead of ending the route in a general area selected by the user or even on the main street leading to the mall, the subject system can adjust this waypoint and lead the user to a free parking garage attached to the shopping mall. Thus, the user is guided to a more realistic and more reasonable destination rather than to a street intersection nearby.

In some cases, it may be determined that the destination cannot be reached or the route cannot be generated based on the selected waypoints in view of the desired mode of transportation. For instance, the user may have selected an end waypoint in the middle of a park. However, this area of the park is only accessible by foot. In these cases, multi-modal routing can be initiated to determine a route that employs multiple modes of transportation and keeps costs to a minimum. As a result, the multi-modal route may direct the user in his car through the entrance and to a parking lot. From there, the directions can guide the user to his desired waypoint by foot.

Determining user intent can also improve the quality and/or relevancy of contextual advertisements served to users according to their planned routes. For example, the system can find various entities such as parks, businesses, and landmarks near, next to, or within a set distance from a user's selected waypoint (e.g., endpoint). One or more advertisements for such places could then be served to the user. Additional factors such as mode of transportation, wait times, and fuel consumption can also be considered when selecting the advertisements. For example, if the route ends at a shopping mall parking garage, then it can be inferred that the user intends to enter the mall to shop and/or eat. Contextual advertisements valid during the expected time frame of the user's visit for mall businesses relating to sales, food coupons, discounts, and the like can be served to the user. This may be helpful for travelers who plan in advance. In addition, it can be useful to those who experience unexpected delay times or extended wait times and have access to the routing system (e.g., via an Internet connection). Furthermore, an interest profile for the user can also be created wherein user preferences for places, fields of interests, and the like can be stored and subsequently referenced to better serve more relevant advertisements to the user. In particular, the interest profile can be built according to information obtained explicitly from the user as well as implicitly based on the user's selected waypoints, advertisement selection, or previous endpoints.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with route generation and presentation of the most relevant contextual advertisements for a given user. For example, the systems and methods can analyze previous advertisements selected by the user and infer which types or kinds of establishments the user prefers to patronize. Based on these inferences, the system, for instance, can select more appropriate accommodations, restaurants, parking areas, shopping areas, types of stores, etc. to present to the user. In practice, the user may be repeatedly shown advertisements for store coupons at a well-known discount chain store along with locally owned convenient stores. Given at least these two options, the user consistently selects the locally owned convenient store. Thus, the system can infer that the user prefers the locally owned store over the large discount chain option and modify the advertisement selections accordingly.

Similar inferences can be drawn from routes selected by the user. For example, the user may consistently request the system to re-route her travel to avoid certain highways, tunnels, or bridges. The system can learn from this and infer that the user most likely is willing to travel perhaps additional miles and/or extend the length of her trip to avoid similar highways, tunnels, or bridges and adjust the routing of additional trips accordingly. For the user who typically flies, she may prefer to avoid stops in Chicago's O'Hare Airport during the winter due to consistent delays and weather issues. The system can also examine previous flights selected by the user based on when they were made and look for behavioral patterns according to time periods or seasons. Thus, the system could infer that the user will not want to fly through Chicago, Minneapolis, and/or Cleveland (e.g., major cities near Chicago that also experience snowy weather) during at least November through February and will have to choose another city with a major airport that she can connect through from the east coast to the west coat or vice versa or for international travel. By analyzing the user's behavior in route or advertisement selection, the system can perform more efficiently and effectively for the user and mitigate user frustration as well.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
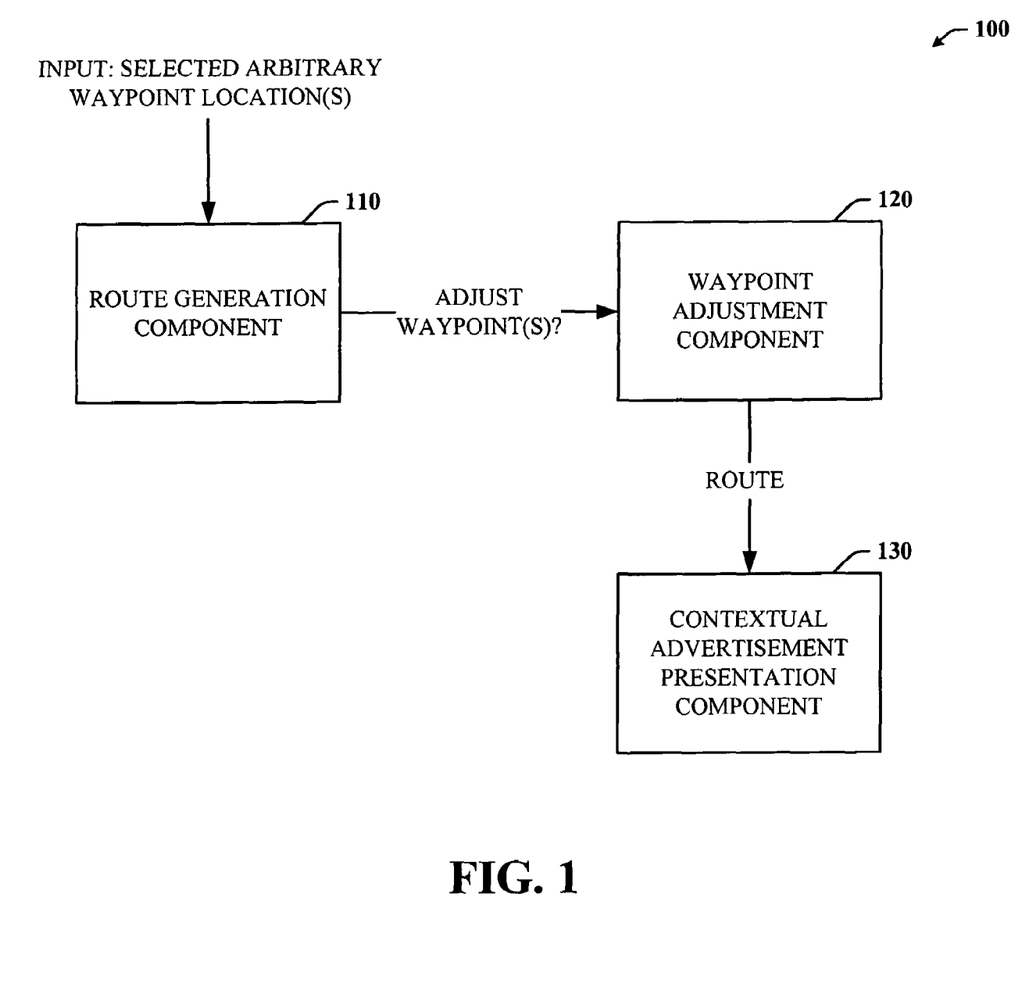
FIG. 1 is a block diagram of a routing system that facilitates adjusting waypoints to generate a more reasonable route and serving more relevant contextual advertisements based on that route.

Referring now to FIG. 1, there is a general block diagram of a waypoint adjustment system 100 that facilitates optimizing routing suggestions in accordance with a cost function as well offering more relevant advertisements based on the suggested or selected route. The system 100 includes a route generation component 110 that can determine whether one or more routes based on arbitrarily chosen waypoints can be generated. Waypoints can include a starting point, ending point, and/or any other points in between. They can be chosen in an arbitrary manner unlike conventional routing systems. This means that the user can simply select a point on a map or image whether it is a street location, an island, a body of water, a building or airport, or a park without needing to know an address, a street name, or any other schema specific location identifiers. The system's 100 underlying data networks (not shown) can identify the selected location and transform it into coordinates understood by the respective system or related components.

If the route generation component 110 determines that a route using the user's desired mode of travel cannot be generated, the selected waypoints can be communicated to a route adjustment component 120 that examines the waypoints based on the desired mode of travel (e.g., car, train, bus, plane, etc.) and estimated costs. The costs are based on a weighted function of time, fuel, equipment cost, and other travel related expenses such as parking, toll fees, lodging, food, and the like. When adjusting the route, the cost function should be optimized in order to minimize overall costs of the trip.

To determine how to adjust the selected waypoints, the waypoint adjustment component 120 can reference the underlying data networks to obtain further information about the selected waypoints and/or to obtain information regarding other areas, attractions, businesses, or locations near one or more of the selected waypoints. For example, the adjustment component 120 can look up information about at least one of the selected waypoints to determine if it has special attributes and then estimate the user's intentions with respect to the selected waypoint. In practice, for instance, imagine that user has selected to stop at a waypoint 250 miles into the trip, but the selected waypoint location is actually in the middle of the highway. The adjustment component 120 can evaluate the surrounding areas closest to this waypoint and find 2 rest stops: the first one only has a single gas station and may be located about 25 miles back from the '250 mile marker'; while the second one is a larger complex with 3 gas stations, a few restaurants, 2 motels, and a convenient store that is located about 30 miles further down from the '250 mile marker'. Instead of routing the user to the original waypoint, the adjustment component 120 can infer from the original waypoint selection that the user's intention was most likely to stop for gas, restroom use, and food.

In order to determine which option to choose for this particular user, the adjustment component 120 can analyze the 2 options based on the weighted cost function and select the option that minimizes the overall costs for the user. If the first option were chosen, then the user could stop for gas earlier but then would inevitably need to stop again for food, drinks, etc. which would require additional time. The gas prices at the larger complex may also be less as well since there is more than one station competing for business. The second option provides more flexibility for the user depending on the user's circumstances when the rest stop is reached—such as time of day or specific needs that may arise. For example, if the user begins driving at night, he may decide to spend the night before continuing on and the second rest stop includes lodging accommodations. In addition, if the user wasn't feeling well or wanted to have other snack food in the car, he could buy any of these items from the convenient store. Thus, the second rest stop option minimizes the overall costs for the user. The waypoint adjustment component 120 can adjust the original waypoint selection to the rest stop location located at about 280 miles into the trip and present the final (adjusted) route to the user as appropriate.

It should be appreciated that the system can also consider other types of transportation when evaluating the selected waypoints to determine whether the cost function is optimized. Based on its calculations, the system or waypoint adjustment component 120 can determine whether more than one mode of travel would minimize costs. If this is in fact the case, multi-modal routing can be activated and combined with the best adjusted route found by the waypoint adjustment component 120. Recall that multi-modal routing involves multiple modes of transportation to travel to a final destination. This may be particularly useful when destinations cannot be reached by the same mode of transportation based on physical or geographic obstacles such as land restrictions, mountains, or water or when using more than one mode of transportation reduces the overall costs of the trip. Examples of different modes of transportation include but are not limited to car, train, commercial plane, commuter plane or helicopter, foot, bicycle, boat, or ferry.

The final route can be communicated to a contextual advertisement presentation component 130 that can select one or more advertisements which are most relevant to the user and to the current route from a database of advertisements. Selection of the advertisements can be based on the user's mode(s) of transportation, estimated wait times at "in-between" waypoints, length of the overall route, travel time, and user intentions as previously determined. Presenting more relevant contextual advertisements given user attentiveness to advertisements presented in this manner and available screen space limitations increases the likelihood that the user will be more receptive to them and advertisers are more likely to find the value in these types of advertisements and obtain higher revenues as a result.

Referring to the user example above, advertisements for some of the businesses located at the selected rest stop (adjusted waypoint) can be presented to the user such as restaurant specials or coupons and a sale at the convenient store that is effective now through the next month. If the route suggested or indicated that the user would need or desire lodging for at least one night, then motel accommodations and current rates could be presented to the user. If the user's route goes by an outlet shopping mall and based on other route and travel details, it appears that the user would be interested in shopping malls, the advertisement presentation component 130 can select an advertisement and discount coupons for the outlet shopping mall since the user will be driving passed it.

Furthermore, advertisements can be selected based on the predominant mode of transportation. For example, if the user will be traveling by foot for a particular portion of the route, businesses located along that path can be given more weight and thus selected for presentation. Additionally, when scheduled wait times are significant, businesses in the vicinity of the wait area can be given more weight as well and selected for presentation since it more likely that the user will take advantage of their "waiting" time and patronize nearby businesses.

The selected advertisements can be presented together with the route or separate from the route based on user or system preferences. In addition, they can be presented where relevant along the route if the user is viewing the route and/or driving instructions in a turn-by-turn view or other similar view.

Figure 2:
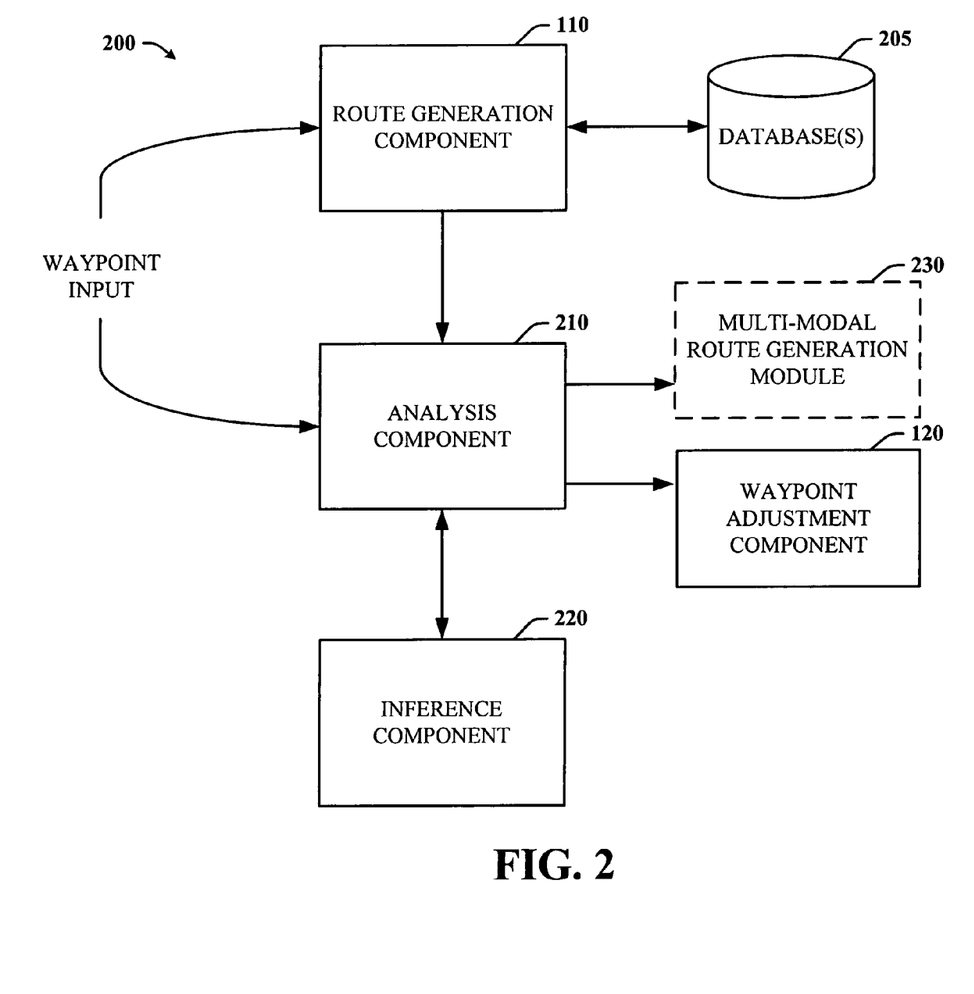
FIG. 2 is a block diagram of a routing system that facilitates adjusting waypoints to generate a more reasonable route in part by analyzing user state and inferring user intentions.

Turning now to FIG. 2, there is a block diagram of a routing system 200 that facilitates adjusting waypoints to generate a more reasonable route in part by analyzing user state and inferring user intentions. Similar to the system 100, the system 200 can receive the waypoint selection input and determine whether a route can be configured based on such input (using the route generation component 110). This determination can be made based in part on information obtained from one or more databases 205 associated with any underlying data networks.

If the waypoint locations are reachable using the desired means of transportation, the selected waypoint input can be analyzed together with any available user information or preference data to determine the user's state or intentions the user may have for the waypoints or for the trip as a whole—via an analysis component 210. In addition, an inference component 220 can be employed to provide further insight into the user's state or intentions. For example, the user's previous routes, previous and/or current selected waypoint locations, indicated preferences, mode of transportation, and length of trip (including distance traveled) can be considered when determining the user's current intentions or current state. The analysis of the user's state along with the current waypoint selections can be communicated to a multi-modal generation module 230 and/or to an adjustment component 120. The multi-modal generation module 230 can process the given data and configure a multi-modal route that satisfies the user's preferences or other conditions such as staying within a specified budget or cost range for specific or all parts of the trip.

The adjustment component 120 can determine whether it would be more cost-effective to adjust any of the selected waypoint locations based on the user state analysis as well as on the selected waypoint locations. In some cases, the original route can be adjusted to bring the user as close as possible to the desired waypoint. For example, the original route may end the user's route on a busy main road often times without even a street number. Regardless, it can be difficult for a user to find his precise end location particularly if he is not familiar with the area even when given a complete street address.

Suppose the user's state analysis suggests or guesses that the user is probably headed to a well-known indoor/outdoor adventure center located off that particular street that offers rock climbing, batting cages, miniature golf, putting greens, go-cart track, a race track, and the best hot dogs in town. This may be surmised from the user's profile information, previous trips taken, previous adjusted waypoint selections, and/or websites he was recently surfing or searching. Instead of ending the user's trip on the busy main street, the adjustment component 120 can determine that the adventure center is the true destination and adjust the end waypoint accordingly. For example, the adjustment component 120 can guide the user down a small street off the main street to a parking garage connected to the adventure center. In addition, garage parking may be free on certain days such as the user's scheduled arrival day so an appropriate advertisement can be presented to the user to make him aware it. Thus, the user is brought closer to his desired end waypoint by way of the adjustment component 120 while not incurring any unwanted or additional costs.

Multiple routes and types of routes can be generated and presented for the user's selection. For example, imagine that for a given set of waypoints, a multi-modal route and an adjusted route are both created and presented to the user for selection. Both routes effectively minimize all costs with consideration of the user's preferences and/or indicated routing and timing conditions. The two routes may be within a few dollars of each other in terms of monetary cost and within 30 minutes in terms of a time cost. However, the cost difference between the two routes can be within the user's allotted ranges and thus be acceptable for user consideration. It should be appreciated that these ranges can be modified at any time as desired or needed.

Figure 3:
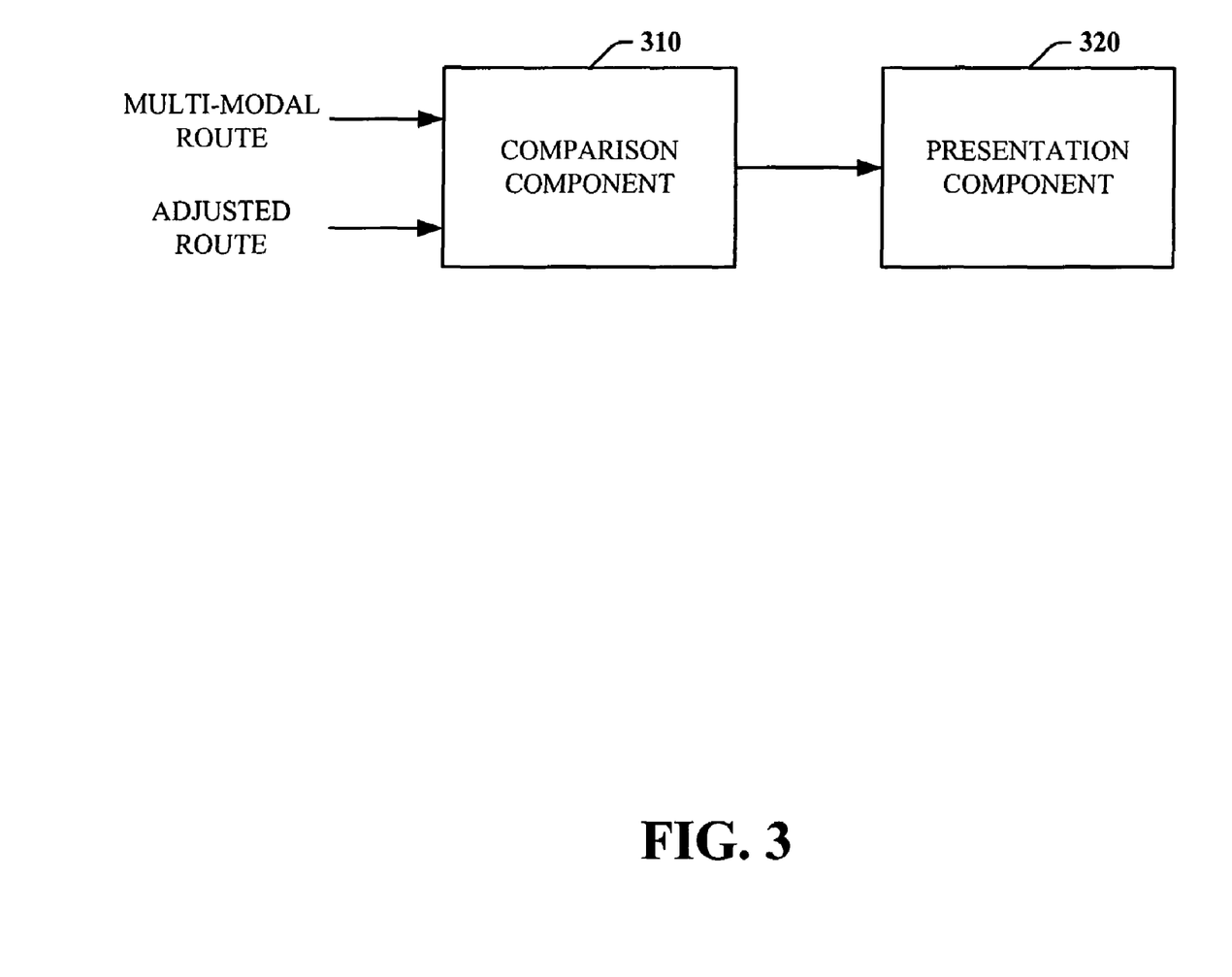
FIG. 3 is a block diagram of a routing system that facilitates determining a route which optimizes a cost function.

As shown in FIG. 3, the user can request a more detailed comparison of the available suggested routes. A comparison component 310 can compare the suggested routes in terms of the weighted cost function as well as other weighted factors that the user can include such as time of day for travel, tourist attractions along the route or near designated "in-between" waypoints, and the like. The comparison component 130 allows the user to fine tune the weighted cost function by permitting the user to further narrow preferences or to modify the weights of various factors considered in the cost function. For example, the user may have given fuel consumption and wait time nearly equal weights in the initial cost function. At this comparison stage, however, the user can choose to place more weight on wait time rather than on fuel consumption—meaning that when choosing between at least two similar routes in terms of overall costs, the user would rather consume more fuel than wait a longer time. Finally, a presentation component 320 can present the selected route to the user.

In the alternative, the comparison can be performed without the user's explicit knowledge of the available routes and the route which has the lowest overall costs in terms of the weighted cost function can be automatically selected and then presented to the user. That is, the user can choose to receive the most optimized route rather than be shown multiple routing options.

Figure 4:
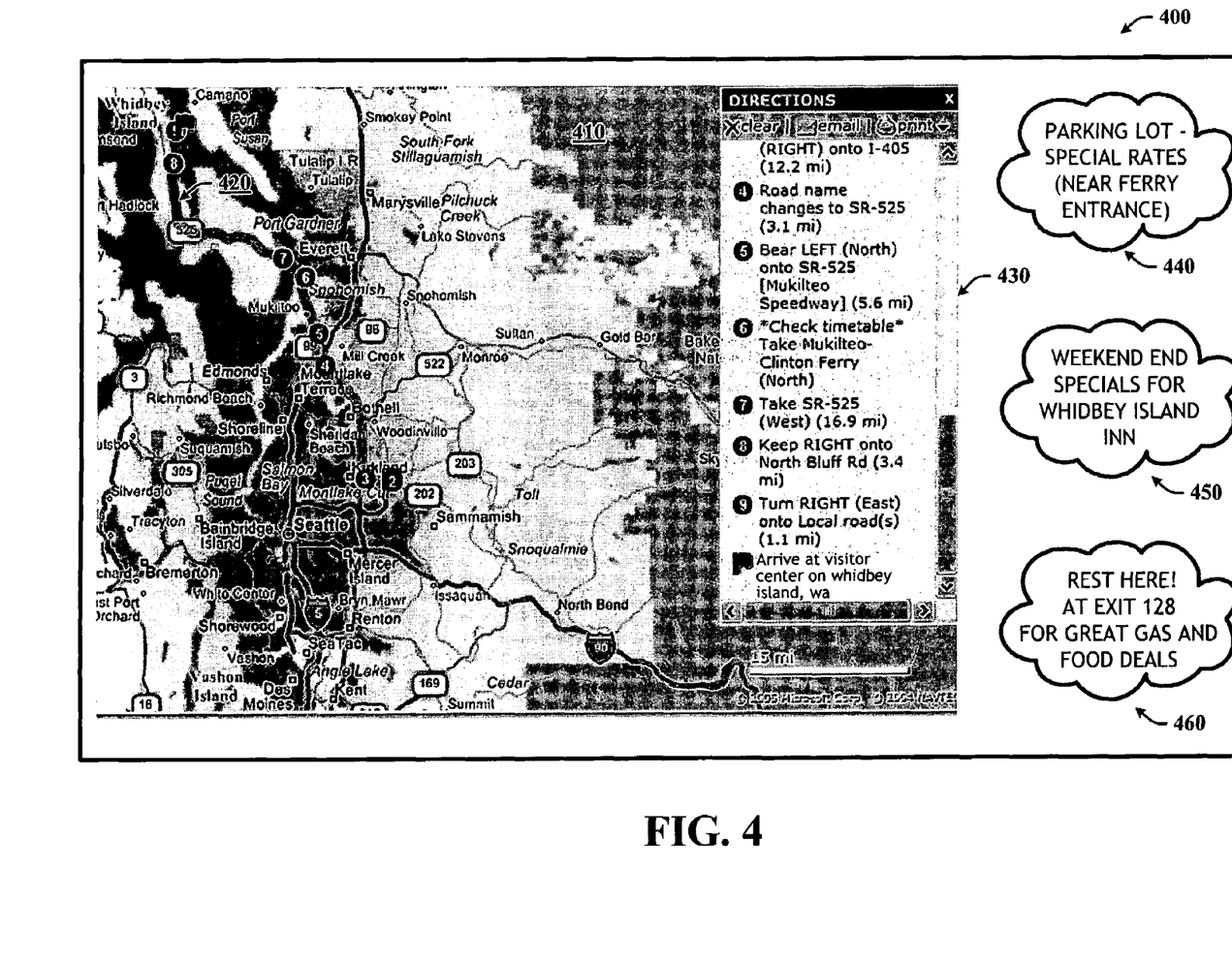
FIG. 4 is an exemplary user interface of a route generated by the routing system of FIGS. 1 and/or 2 and multiple contextual advertisements that are relevant to the selected route.

Turning now to FIG. 4, there is an exemplary user interface 400 that includes the presentation of a sample route that can be generated by the routing system(s) of FIGS. 1 and/or 2 and of multiple contextual advertisements that are relevant to the selected route and the user. As pictured, the user interface 400 includes a high level or over view map display 410 of the entire route 420 from Redmond, Wash. to Whidbey Island, Wash. (e.g., no other destination information given by the user). Also shown are the driving directions 430 for this particular trip. Though not depicted in the figure, the driving directions 430 can include in-between waypoints or stops along the route. Here, the directions include a ferry ride as part of the route, thus indicating that multi-modal routing was employed to configure the most optimum and cost-effective route based on the user's desired mode of transportation (e.g., car) for this particular trip. Notice that the end destination has been adjusted to the visitor center on Whidbey Island since no other destination information was provided by the user. In this case, the visitor center may be the most common or frequent stop by travelers arriving on the island or it may be the location closest to the user when driving before reaching any other businesses.

Based at least in part on the route and weighted cost function, one or more contextual advertisements are presented to the user in a static or cyclical manner (if they do not all fit on the screen). Here, the advertisements relate to special parking lot rates should the user decide to park his car while waiting for the ferry (440), lodging accommodations on the island (450), and rest stop advertisements for a rest stop along the drivable portion of the route (460). The advertisements can be selected based not only on content as it relates to the user's route, in-between waypoints, and wait times, but also to provide options to the user that may lower expenses with respect to food, gas, toiletries, lodging, local attractions, etc. Thus, the advertisements presented to the user are more tailored to the user's own preferences and cost function weights. Therefore, the same advertisements may not be relevant to two different users who happen to be traveling the same route (separately from one another) at about the same time.

Figure 5:
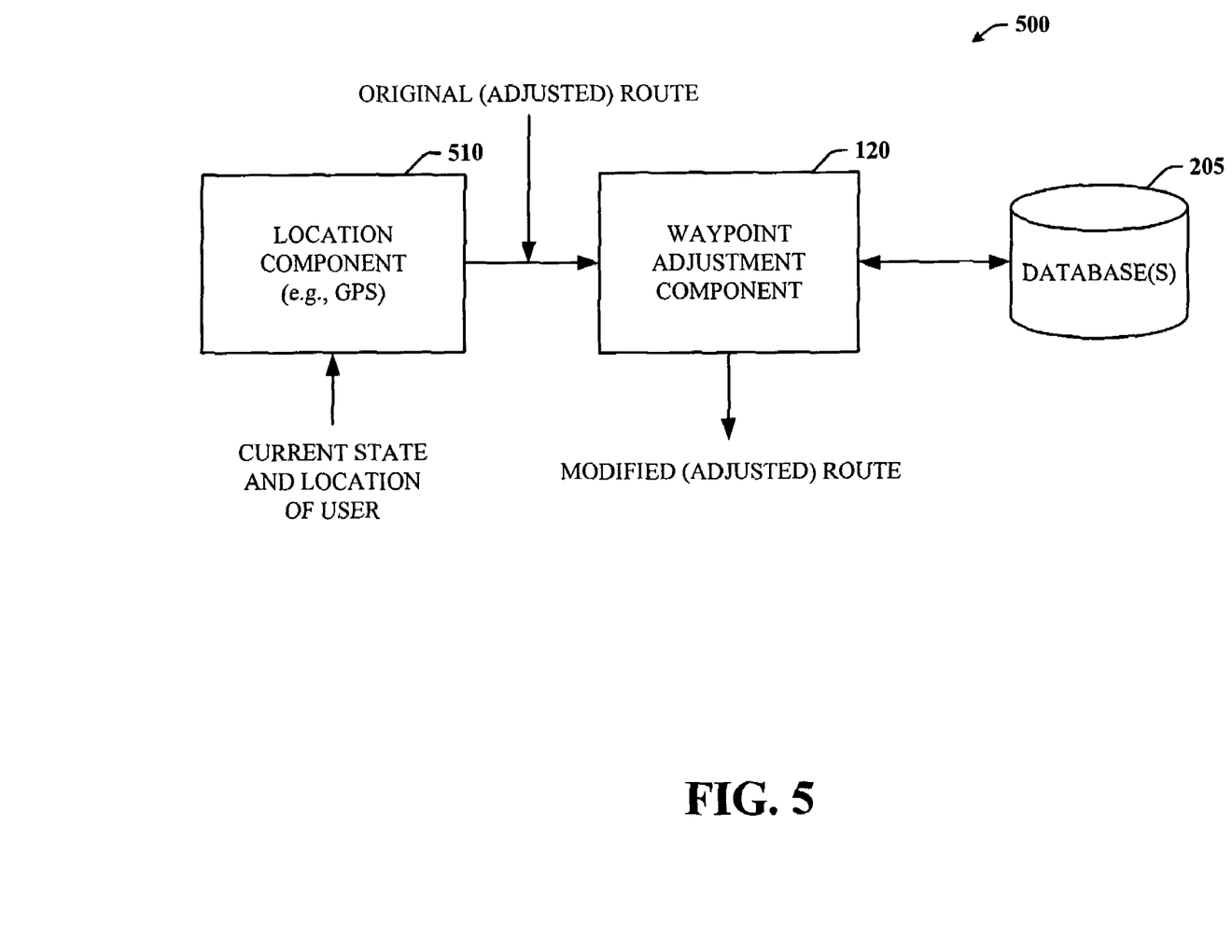
FIG. 5 is a block diagram of a routing system that provides a newly adjusted route based on a current user state and an existing route.

Referring now to FIG. 5, there is a block diagram of a routing system 500 that provides a newly adjusted route based on a current user state and an existing route such as after the user has begun traveling. The system 500 includes a location component 510 such as a GPS (global positioning satellite) system that assesses the user's current position in terms of location and direction (e.g., I-90 westbound). The location component 510 communicates the user's current position and/or state to the adjustment component 120. The adjustment component 120 can analyze the user's current position and/or state along with the original (selected) route and determine how to further adjust the route to assist the user with reaching the next destination. This system 500 can be useful when unanticipated roadway detours occur or when the user spontaneously decides to take a "side trip" off of the designated route; but at some later point in time, wants to resume his trip from his current location. Again the adjustment component 120 can utilize underlying data networks or databases to adjust the route in the most efficient and cost-effective manner.

Figure 6:
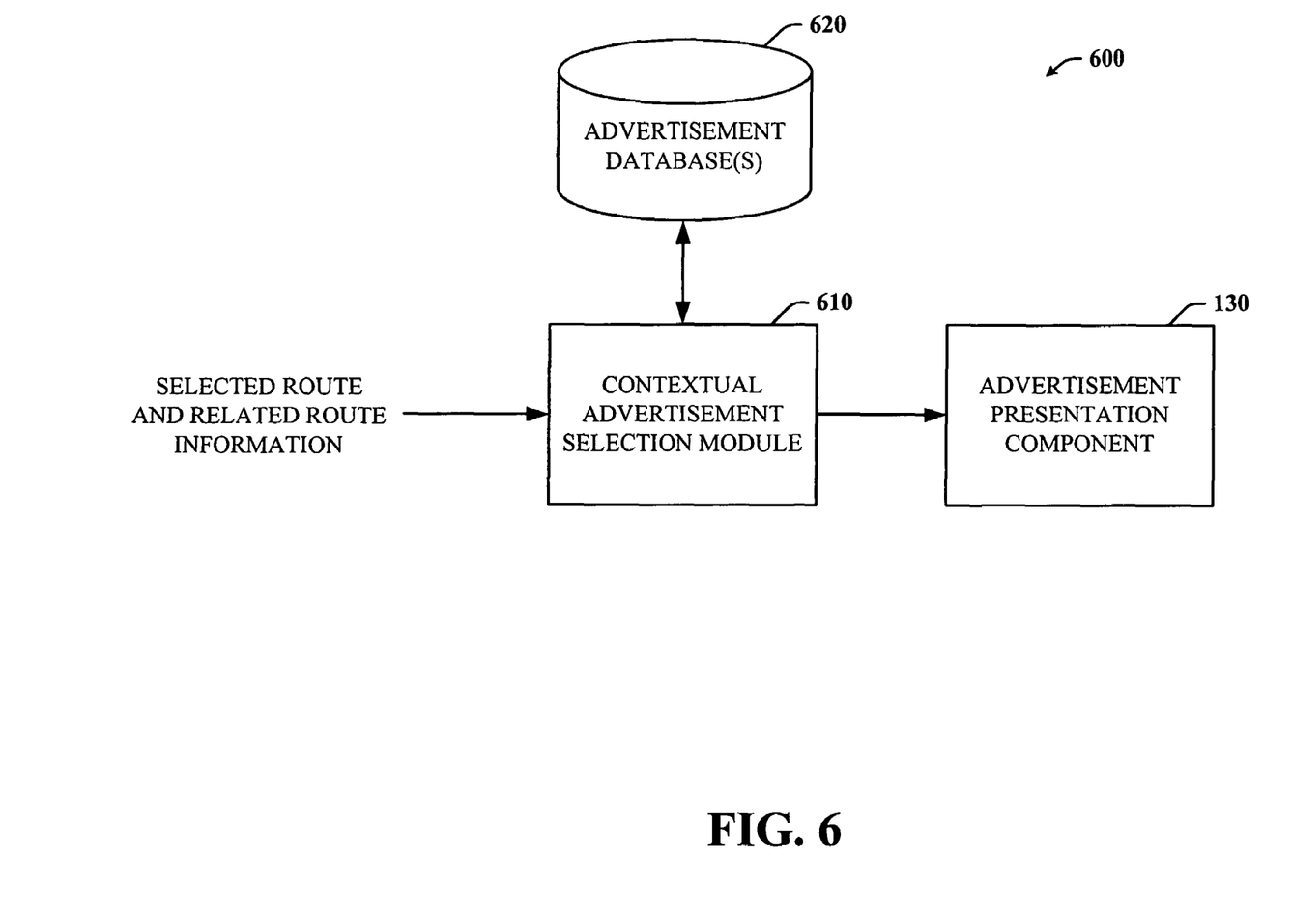
FIG. 6 is a block diagram of a routing system that facilitates serving more relevant contextual advertisements that minimize costs and that are based on the selected route or current route.

Turning to FIG. 6, there is a block diagram of an advertisement sub-system 600 portion of a routing system that facilitates serving more relevant contextual advertisements in order to minimize travel costs and enhance the travel experience. A selected route and any related route information such as wait times, in-between waypoint locations, and user intentions and explicit preferences for the particular route or trip can be provided to a contextual advertisement selection module 610. The selection module 610 can evaluate the information and retrieve the most appropriate advertisements from an advertisement database 620 based on particular factors such as mode of transportation, route type, route purpose (e.g., business or pleasure), budget or cost allowances, waypoint locations, distance between waypoint locations, wait times, and estimated arrival times to the locations, for example. Additional factors may be included as well and should be not excluded from consideration.

Once the suitable advertisements are selected, they can be presented to the user by an advertisement presentation component 130. The advertisements can be stored along with the corresponding route or can change dynamically depending on update requests and the online status of the user. Furthermore, they can be viewed and updated in a live manner as the user is en route.

In terms of the format, they can be displayed in a scrolling or cyclical format, all at once, individually, or in groups of related advertisements (e.g., lodging ads shown together, food advertisements shown together, etc.), or can be shown where relevant with respect to a particular portion of the route. For example, advertisements for local shops and restaurants can be more appropriate for a waypoint stop with a longer wait time (e.g., 4 hour wait between plane landing/arrival and boarding cruise ship) than one with relatively no wait time (e.g., fuel stop). Some advertisements can be location specific as well. Suppose a user is traveling by train from Portland, Oreg. to San Diego, Calif. and stops in San Francisco along the way for a train change. An advertisement for a restaurant local to San Diego, Calif. can appear to be irrelevant or far less relevant to the user if it is presented in the context of the San Francisco stop and the user may forget about it by the time he reaches San Diego.

In addition to the particular travel data associated with a current route such as the selected waypoints, other implicit data can be employed to determine which advertisements are better suited for each unique user. The implicit data can be based on previously selected waypoints, previously selected advertisements, and/or known user preferences or interests (e.g., electronics, water landmarks, etc.). Such data can be used to build an interest profile for the user which can be referenced when determining which advertisements to present to the user. For example, imagine that Sherry has a planned route ending at a large electronics outlet. This information can be stored in her interest profile. During the planning of a subsequent trip, a system or component thereof determines that a similar electronics store is located near her selected waypoint. The selection module 610 can infer that she has an interest in electronics based on her interest profile and as a result, can select an advertisement for the electronics store.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 7:
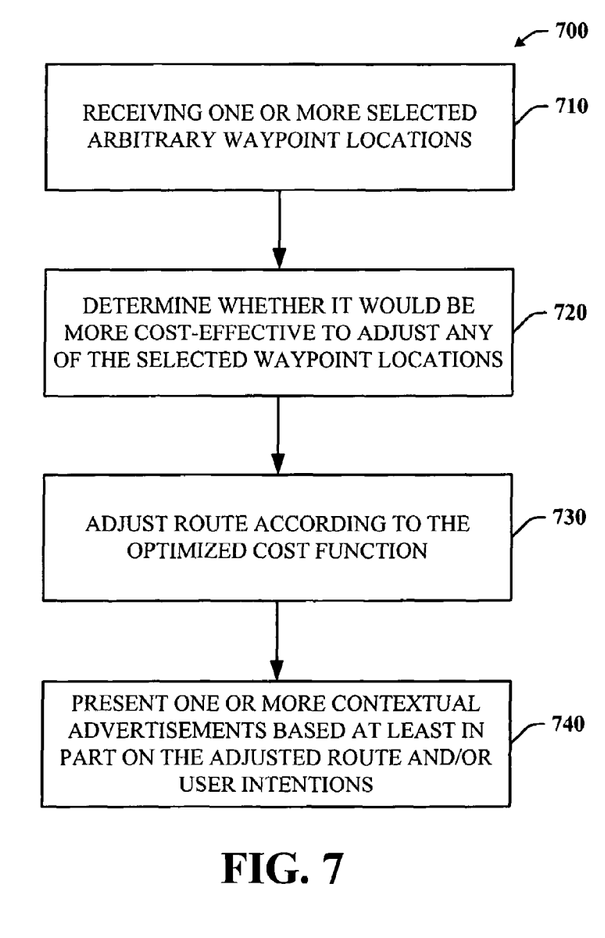
FIG. 7 is a flow diagram illustrating an exemplary routing methodology that facilitates adjusting waypoints to generate a more reasonable route and serving more relevant contextual advertisements based on that route.

Referring now to FIG. 7, there is a flow diagram of an exemplary routing methodology 700 that facilitates adjusting waypoints to generate a more reasonable route and serving more relevant contextual advertisements based on that route. The method 700 involves receiving one or more selected arbitrary waypoint locations at 710. At 720, the method 700 can determine whether to adjust any of the selected waypoint locations based on a weighted cost function. That is, if making any adjustments minimizes overall travel costs and optimizes the cost function, then one or more selected waypoint locations can be adjusted accordingly at 730. At 740, one or more contextual advertisements can be selected and presented to the user based at least in part on the final (adjusted route).

These contextual advertisements can be more relevant to the user compared to traditional contextual advertisement delivery systems because much of the information used to determine whether to adjust any of the waypoint selections can also be used with respect to contextual advertisement selection. For example, user intention information can be analyzed to determine whether adjustments are appropriate or needed. This information can also be utilized by the contextual advertisement selection component to determine which advertisements are the most relevant to the user.

Figure 8:
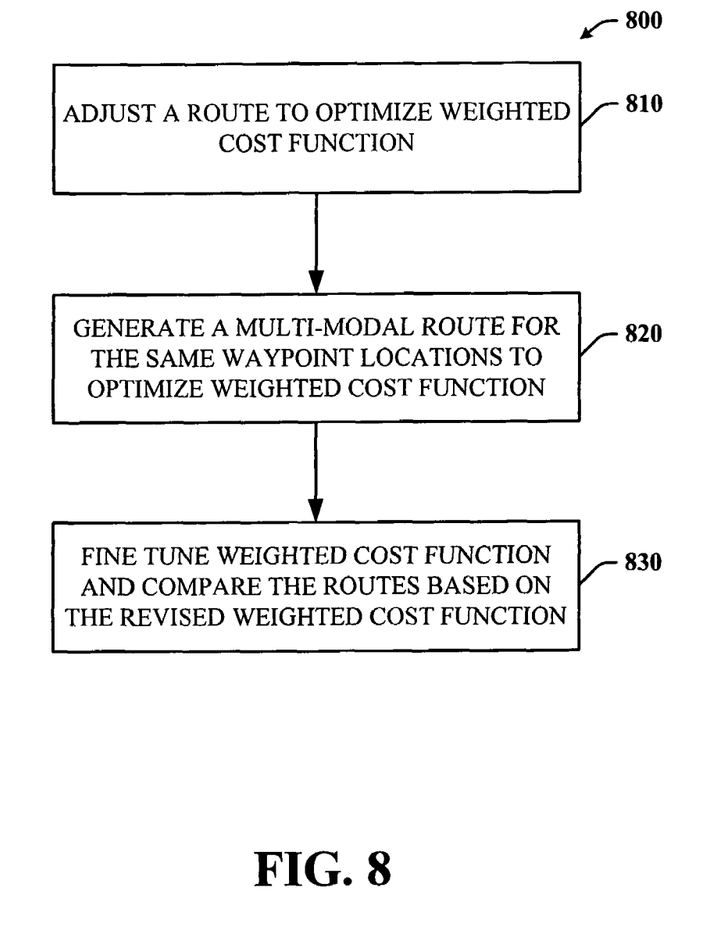
FIG. 8 is a flow diagram illustrating an exemplary routing methodology that facilitates determining a route which optimizes a cost function.

Turning to FIG. 8, there is a flow diagram illustrating an exemplary routing methodology 800 that facilitates determining a route which optimizes a cost function. The method 800 involves adjusting one or more waypoint locations of a route to optimize a weighted cost function in order to minimize overall costs at 810. At 820, a multi-modal route can be generated for the same waypoint locations to optimize the weighted cost function. At 830, the weighted cost function can be fine tuned (modified) to compare the two routes to determine which is the most preferred by the user—based on the fine tuned cost function. Though not depicted in the flow diagram, contextual advertisements can be presented according to the "final" route as well as user intentions.

Figure 9:
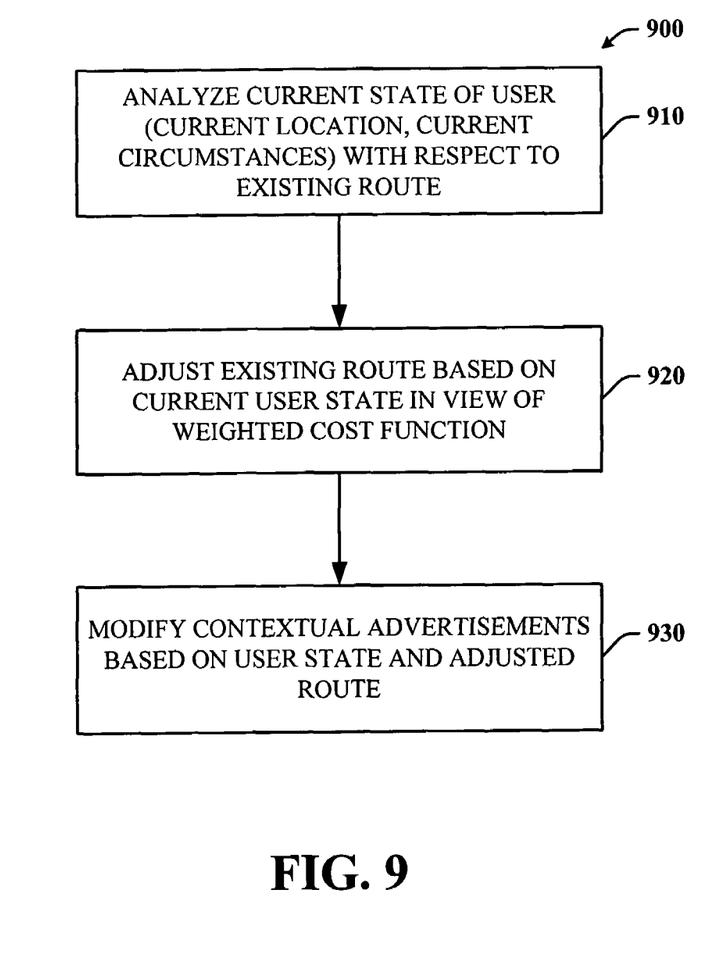
FIG. 9 is a flow diagram illustrating an exemplary routing methodology that facilitates updating a selection of contextual advertisements based on the current or newly adjusted route in order to minimize overall costs.

Referring now to FIG. 9, there is a flow diagram illustrating an exemplary routing method 900 that facilitates updating the selection of contextual advertisements based on the user's current state or route in order to continue to minimize costs and travel expenses. When the user has taken a voluntary or involuntary detour from the planned route and desires to resume the route, the method 900 can analyze the current state of the user including the current location at 910 such as via GPS system (assuming that it is available and in use). At 920, the planned route can be adjusted according to the user's current state and location and cost function. At 930, the user can be presented with a modified selection of contextual advertisements (such as on an in-car or mobile computing device).

Moreover, the systems and methods as described herein can operate in a variety of computing environments and on various computing devices—both mobile and non-mobile. For example, the routing system and method can be accessed on a PDA, laptop, desktop, smartphone, or any other personal or handheld computing device. In addition, it can be employed in a dashboard or in-car computer and display unit.

Figure 10:
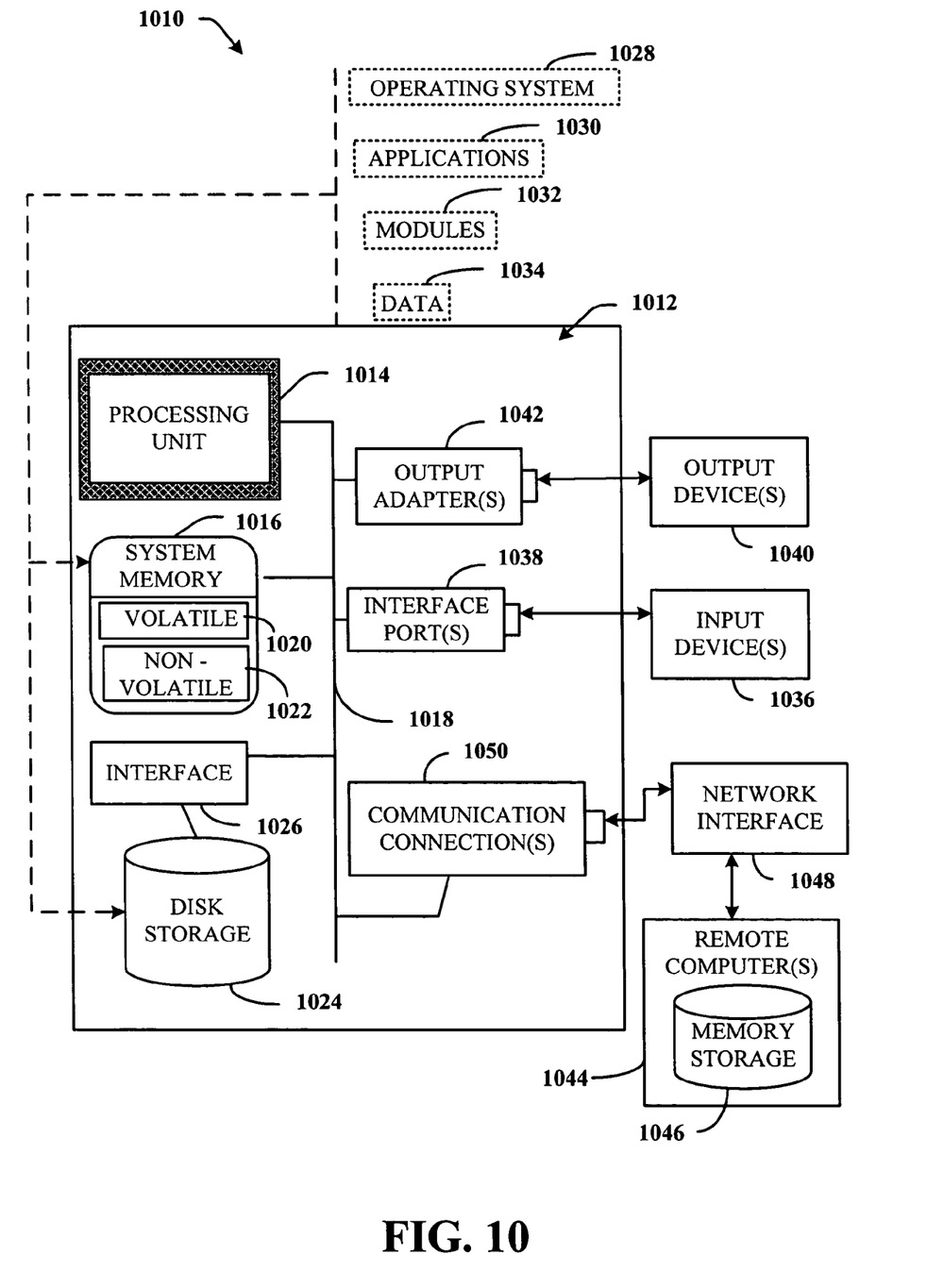
FIG. 10 illustrates an exemplary environment for implementing various aspects of the invention.

In order to provide additional context for various aspects of the subject invention, FIG. 10 and the following discussion are intended to provide a brief, general description of a suitable operating environment 1010 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates configuring a most reasonable and cost-effective travel route comprising:
    at least one processor that executes the following computer executable components stored on at least one computer readable medium:
    a route generation component that receives selected waypoint locations;
    a waypoint adjustment component that determines whether it is more cost-effective to adjust any of the selected waypoint locations based at least in part upon optimizing a cost function to minimize overall travel costs; and
    an inference component that infers user preferences based on previous waypoint selections in order to facilitate desirable route configuration.

2. The system of claim 1, wherein the waypoint locations comprise a start waypoint, an end waypoint, and one or more waypoints in between the start and the end waypoints.

3. The system of claim 1, wherein the route generation component determines whether the selected waypoint locations are reachable based on a desired mode of transportation and other weighted factors.

4. The system of claim 1, wherein the cost function is a weighted function of at least one of the following: time, fuel, equipment cost, distance, and other expenses associated with travel.

5. The system of claim 1, wherein the waypoint adjustment component determines whether to adjust one or more selected waypoint locations based in part on the desired mode of transportation and adjusts one or more waypoint locations accordingly.

6. The system of claim 5 further comprises a multi-modal route generation module that configures a multi-modal route using one of the selected or adjusted waypoint locations that optimizes the cost function while utilizing at least two modes of transportation.

7. The system of claim 1, wherein the waypoint adjustment component evaluates user intention according to at least one of the following: distance between waypoint locations, time, fuel consumption, and businesses located within a selected distance from a selected waypoint location when determining cost-effective adjustments to the waypoint locations.

8. The system of claim 1 further comprises a contextual advertisement presentation component that selects and presents one or more contextual advertisements based at least in part on one of the following: user intention, interest profile, route, route type, purpose for route, distance between waypoint locations, adjusted waypoint locations, mode of transportation, wait times, and locality where waiting or stopping.

9. The system of claim 8, wherein the one or more contextual advertisements are selected to facilitate optimizing the cost function.

10. The system of claim 1, further comprising a comparison component that permits a user to narrow preferences or to modify weights of factors considered in the cost function.

11. A method that facilitates configuring a most reasonable and cost-effective travel route comprising:
    employing a processor to execute computer readable instructions stored on a computer readable medium to perform the following acts:
    receiving selected waypoint locations;
    determining whether it is more cost-effective to adjust any of the selected waypoint locations based at least in part upon optimizing a cost function to minimize overall travel costs, wherein the cost function is a weighted function of expenses related to at least one of fuel, equipment, parking, toll fees, lodging, and food; and
    inferring user preferences based on previous route or waypoint location selections.

12. The method of claim 11 further comprises adjusting one or more selected waypoint locations based in part on at least one of the following: user intention, mode of transportation, time, fuel consumption, and user preferences.

13. The method of claim 11 further comprises determining whether the selected waypoint locations are reachable by a desired mode of transportation; and adjusting one or more of the waypoint locations to accommodate the desired mode of transportation given the cost function.

14. The method of claim 13 further comprises initiating multi-modal routing after adjusting the one or more waypoint locations in order to further optimize the cost function and minimize overall costs.

15. The method of claim 11 further comprises selecting and presenting one or more contextual advertisements based at least in part on at least one of the following: waypoint location, adjust waypoint location, user intentions, interest profile, route, route type, wait times, mode of transportation, and distance between waypoint locations.

16. The method of claim 15, wherein the mode of transportation comprises motorized vehicle, bicycle, train, car, airplane, helicopter, bus, boat, ship, and foot.

17. The method of claim 11, wherein the cost function comprises a weighted function that is customizable.

18. A system that facilitates configuring a most reasonable and cost-effective travel route comprising:
    at least one processor that executes the following computer executable components stored on at least one computer readable medium:
    a route generation component for receiving selected waypoint locations;
    a waypoint adjustment component for determining whether it is more cost-effective to adjust any of the selected waypoint locations based at least in part upon optimizing a cost function to minimize overall travel costs, wherein the cost function is a weighted function of expenses related to at least one of fuel, equipment, parking, toll fees, lodging, and food;
    an inference component for inferring user preferences based on previous waypoint selections in order to facilitate desirable route configuration; and
    a contextual advertisement presentation component for selecting and presenting one or more contextual advertisements based at least in part on at least one of the following: a waypoint location, an adjusted waypoint location, user intentions, a route, a route type, wait times, a mode of transportation, and a distance between waypoint locations.

19. A method for travel routing, comprising:

employing a processor to execute computer readable instructions stored on a computer readable medium to perform the following acts:

receiving a waypoint selection of a user;

determining that the waypoint selection is inconsistent with the user's intent;

evaluating areas surrounding the waypoint;

based on the evaluating, inferring a likely intent of the user; and based on the inferred likely intent, changing the waypoint to a different waypoint.

20. The method of claim 19, further comprising presenting an advertisement for a business along a path to a waypoint based at least in past on a waiting time associated with the business.

* * * * *